Jan. 1, 1935.    A. J. FISCHER    1,986,332
SEWAGE TREATMENT
Filed July 29, 1932
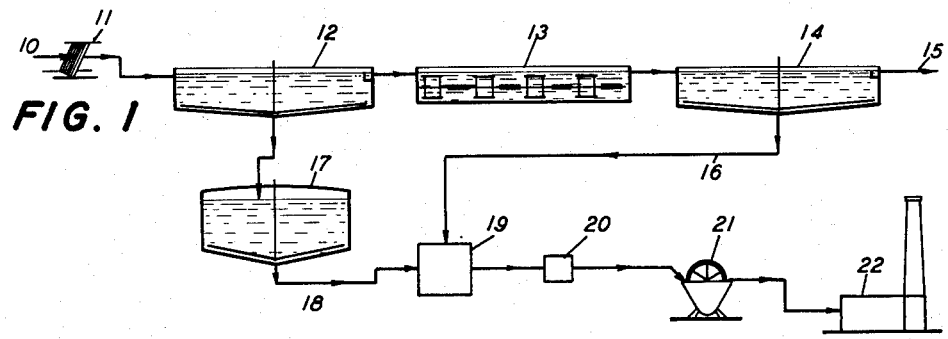
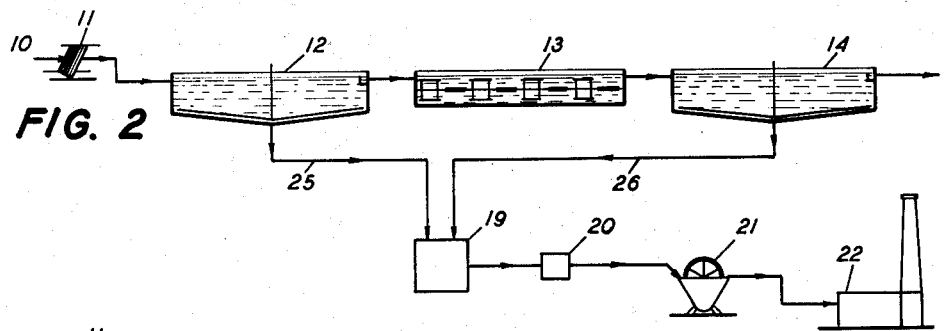
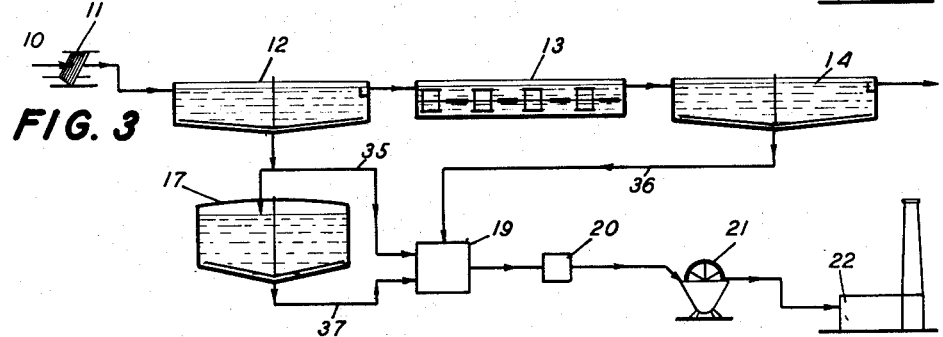
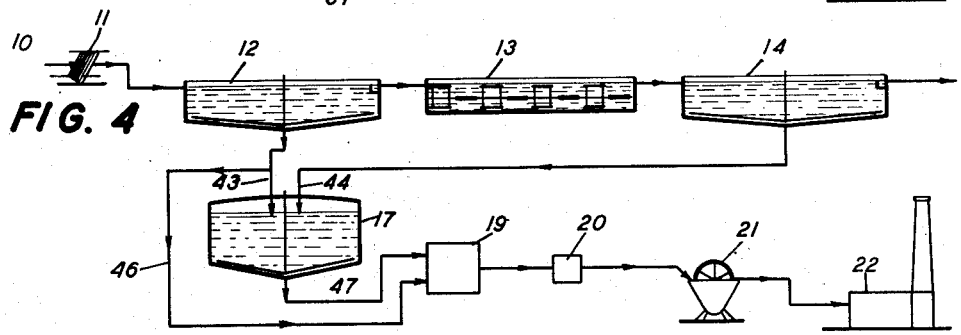
INVENTOR
ANTHONY J. FISCHER
BY
ATTORNEY Patented Jan. 1, 1935

1,986,332

UNITED STATES PATENT OFFICE 1,986,332

SEWAGE TREATMENT

Anthony J. Fischer, Jackson Heights, N. Y., assignor to The Dorr Company, Inc., New York, N. Y., a corporation of Delaware Application July 29, 1932, Serial No. 625,806

8 Claims. (Cl. 210—8)

This invention relates to improvements in sewage treatment, and in particular to improvements in dewatering the sludge or sludges obtained in the operation of a sewage plant.

A standard flowsheet pertaining to a process of sewage treatment includes a primary clarifier, from which the underflow furnishes the raw sludge, which in turn is fed to a digester. A standard flowsheet also includes an activation step in which the raw overflow from the primary clarifier is aerated, causing fines therein to coagulate and to settle out in a secondary clarifier from which the underflow is discharged as so called activated sludge which being of organic nature, is liable to turn putrid and offensive upon extended exposure to the air. Activated sludge has then been filtered, as in continuous rotary filters for speedy disposal, and it also has been proposed to expose the filter cake for drying and ultimate disposal as a fertilizer. According to customary practice, the digester gas may supply the fuel for a drier, while the digested inert sludge has been disposed of by spreading it over large filter or drying beds. This method of disposal of the digested sludge although laborious and depending upon large areas, has been feasible due to the inert character of the sludge, and has raised no particular objection on that account where sufficient ground area or low land was available.

The problem of dewatering sewage sludge by filtration has heretofore not been solved satisfactorily, and filtration has been commercially used only upon activated sludge. But this treatment requires a relatively large amount of filter aid or conditioning agent such as ferric chloride, which represents a relatively large expense item in the operation of the sewage treating plant.

One object of this invention therefore is to dewater the sludges obtained in the sewage treatment in a direct, reliable economical and efficient manner.

Another object is to eliminate certain expensive or undesirable steps such as sludge-bed drying, and digestion, from the standard procedure.

A further object is to carry the dewatering or filtration step to a point of dryness where the product may be enabled to sustain its own combustion in an incinerator.

To this end the invention contemplates a new method of mixing sludges obtained from different stages of the sewage treating process, prior to further disposal. It has been found that the mixing of various sludges facilitates the dewatering thereof. In such a mixture, one sludge seems to act as a filter aid for the other. As a consequence it improves the operation of the plant; it simplifies or eliminates certain steps otherwise needed; and it tends to carry out the dewatering step to a point of dryness where the dewatered product may be directly incinerated with less or no expenditure of extraneous fuel.

It will be understood that the primary importance of this invention lies in the procedure of mixing sludges, prior to dewatering or filtration whereas the specific manner in which the sludge mixture may be dewatered is secondary. That is to say, while in the disclosure of the drawing the dewatering step is illustrated as being carried out in a rotary filter, it should be understood that the dewatering step may also be performed in any other suitable manner.

For the purpose of illustration in the appended drawing:

Fig. 1 illustrates one modification of the new step of sludge mixing, that is mixing digested and activated sludge prior to filtration.

Fig. 2 illustrates a modification covering the step of mixing raw and aerated sludge.

Fig. 3 illustrates the mixing of raw, digested and aerated sludge.

Fig. 4 the mixing of raw and digested sludge.

The following variations of mixing sludges are contemplated by this invention:

I—Dewatering a mixture of activated and digested sludges

According to one feature of this invention, activated sludge and digested sludge are mixed and then dewatered preferably by continuous vacuum filtration. A new and unexpected result is the outcome of such combination in that the filterability of the mixture is improved over that of the individual sludges, in particular over the filterability of the activated sludge. Improved filterability is seen in such items as more rapid cake formation, less blinding of the filter cloth, and concurrently a lesser amount of conditioner is needed for aiding filtration. In the present invention there is a considerable reduction in the amount of filter aid necessary, due to a novel method of mixing of sludges, which contributes to placing the filtration step on a more economical basis. As a result of the combined filtration of the sludges, there is only one final and sufficiently dewatered sludge product to be handled and this product is well fitted for subsequent disposal by incineration or other manipulation. The result of mixing the sludges is unexpected in that its beneficial effect is distinctly cumulative and reciprocative between the sludges. It can be said that one sludge acts as filter aid for the other.

This feature is represented in Fig. 1 of the drawing. Raw sewage passes at 10 through a bar screen where the rough impurities such as rags, etc. are removed, and then enters into the feed inlet of a primary clarifier 12. The overflow from the clarifier contains dilute finely suspended sewage matter which does not tend to settle unless it is biologically treated as in the subsequent customary aeration tank 13 and then in the secondary clarifier 14. The biological treatment in the aeration or activation tank causes fines to coagulate and to settle in the secondary clarifier tank. The overflow from that clarifier passes out of the system at 15 while the underflow 16 or so-called activated sludge is further treated.

The underflow or raw sludge from the primary clarifier is rendered inert by putrefaction in a customary digester 17 thereby liberating gas of appreciable heat value, which may be used in the final incineration of the sludge or otherwise.

According to this invention the digested sludge leaving the digester at 18 and the activated sludge coming from 16, are mixed as in the mixing station 19, in preparation to dosing it with a filter aid as indicated at 20 and then filtering the mixture in the rotary filter 21. As pointed out above the resulting sewage filter cake is more thoroughly dewatered than it would be when dewatering each sludge individually, and concurrently a saving in filter aid material is attained. The filter cake then is to be burned as indicated by the incinerator 22. If under favorable circumstances the dewatering step be carried far enough the combustion may be largely self-supporting, or else it may be maintained through the gaseous fuel recovered from the digester. The filter and the incinerator represent the final steps into which the flow of all sludges converges.

II—Dewatering raw sludge in mixture with treated sludges

Another feature makes economically possible the filtration of the raw sludge which comes from the primary clarifier. To this end this feature contemplates the admixture of raw sludge to either digested or activated sludge, or both.

(a) Mixing raw with activated sludge

Heretofore, the direct handling of raw sludge in filters has been an unsolved problem due to the obnoxious, gummy and greasy character of the sludge. This has rendered the step of digestion necessary.

I have found that by mixing the raw sludge with treated sludge such as activated sludge, a similar beneficial effect can be obtained as with the mixture of digested and activated sludge outlined above. Again the benefit is reciprocative and cumulative between the sludges. The filtration of the raw sludge is made possible, and the filtration of the activated sludge in turn improved with a concurrent proportionate reduction in the amount of filter aid required. Surprisingly enough, the raw sludge is thus turned from a liability into an asset.

Furthermore, if the entire amount of raw sludge be filtered together with the activated sludge, this opens up the prospect of eliminating the digester and thereby cutting out a considerable portion of the installation and operating cost. This also eliminates the digested sludge beds and their auxiliaries. A single sufficiently dry sludge product results which is suitable for incineration.

Fig. 2 illustrates this modification. The basic and standard arrangement of the primary clarifier 12, the aerator 13, and the secondary clarifier 14, as in the Figure 2. The digester, however, is omitted in order to mix raw sludge 25 from the primary clarifier directly with activated sludge 26 from the secondary clarifier 14, in the mixing station indicated at 19. The mixture then passes on same as described for Fig. 1, through mixing and dosing steps 19 and 20, the filter 21 and the incinerator 22.

(b)—Mixing raw with activated and digested sludge

According to another alternative, raw sludge can be mixed with digested sludge to improve filterability. If for some reason the use of a digester is desirable, for instance in order to have available some gas fuel, as well as some digested sludge, it is possible according to this alternative to bypass part of the raw sludge before it enters the digester, and mix it with either activated or digested sludge, or with both, for the proposed filtration, while the balance of the raw sludge passes on through the digester. In this case a proportionately smaller digester might be used.

This alternative is illustrated in Fig. 3. It resembles the layout in Fig. 1 insofar as the basic arrangement of a primary clarifier 12, an aerator 13, a secondary clarifier 14, and a digester 17 is concerned. It is noted that this flow-sheet is a compromise between Figs. 1 and 2 and distinguished by the fact that part of the raw sludge from the primary clarifier is bypassed around the digester at 35, to join the mixture of aerated and digested sludge coming through lines 36 and 37 respectively in the mixing station 19, from where the mixture of the three ingredient sludges passes on as above through the mixing and dosing stations 19 and 20 respectively, the filter 21 and then to the incinerator 22.

(c)—Mixing raw with digested sludge

According to a third alternative of filtering raw sludges part of the raw sludge is bypassed around the digester and then mixed with digested sludge alone. Such an alternative applies in the case where there is no activation plant provided. If, however, an activation plant is available in this case the activated sludge therefrom might be passed through the digester together with the raw sludge as has been practiced in known layouts.

This alternative is represented in Fig. 4. Again there is shown a primary clarifier 12 feeding overflow into an activating tank 13 and on into a secondary clarifier 14. Part of the raw sludge at 43 and activated sludge at 44 are fed into a digester 17. Another part of the raw sludge bypasses the digester at 46 and joins the digested sludge 47 in the mixing station 19 from where the mixture passes on through a dosing step at 20 and a filter 21 to an incinerator 22.

Otherwise it is also intended to cover within the scope of this invention any such arrangement in an established plant wherein portions of raw, digested and activated sludge are intermixed in all possible variations for dewatering or filtration.

Whereas, I have described mixing the sludges prior to filtration in a mixing station as at 19, it has been found that if these sludges are mixed and thickened or mechanically concentrated by means of a Dorr picket-fence thickener as disclosed in a patent application to Darby, Serial No.

535,722, much greater filter efficiency is obtained. Such a picket-fence thickener comprises a usual sedimentation basin having traveling arms carrying rakes for sweeping settled sludge to discharge but with the rake arms provided with upstanding palings or rods somewhat resembling a picket fence. The palings in being moved through the liquid being thickened cause channels to be formed and reformed of upwardly flowing liquid from between the solids being sedimented whereby the sludge discharging from the thickener is thicker and has less water in it than normally. As the viscosity of the sludge is increased, less filter area is needed to filter the sludge. Accordingly, I prefer to interpose such a compressive type of thickener ahead of the filters and/or ahead of a digester for use in connection with any mixture of sludges as above described.

I claim:

1. A method of sewage treatment which comprises mixing a plurality of kinds of sedimented sewage sludges derived from different stages of the sewage treatment and preparatory to final dewatering, one of which sludges thus obtained is digested sludge, and dewatering said sludge mixture.

2. The method of sewage treatment comprising sedimenting raw sewage to obtain raw sewage sludge therefrom, subjecting the raw sewage effluent to activation and sedimentation to obtain treated sludge, mixing said raw sludge with said treated sludge to fit the resulting mixture for further dewatering, and subjecting the resulting mixture to dewatering.

3. The method of sewage treatment comprising treating raw sewage sludge obtained from a sedimentation step to digestion, treating raw sewage overflow to activation to furnish treated sludge, then mixing the digested sludge with the treated sludge to fit the same for filtering, and filtering prior to disposal of the sludge solids.

4. The method of sewage treatment comprising treating raw sewage sludge obtained from a sedimentation step to digestion, passing the raw sewage overflow from said sedimentation step through activation to furnish activated sludge, then mixing the digested and the activated sludges to fit the resulting mixture for filtering, and subjecting the resulting mixture to a dewatering step.

5. The method of sewage treatment comprising treating raw sewage sludge obtained from a sedimentation step to digestion, passing the raw sewage overflow from said sedimentation step through activation to furnish treated sludge, by-passing a portion of the raw sludge before digestion, mixing said by-passed portion of the raw sludge with the digested sludge to fit the resulting mixture for a filtering operation, and subjecting the resulting mixture to a filtering operation.

6. The method of sewage treatment comprising treating raw sewage sludge obtained from a sedimentation step to digestion, passing the raw sewage overflow from said sedimentation step through activation to furnish treated sludge, by-passing a portion of the raw sludge before digestion, mixing said by-passed portion of the raw sludge with the activated sludge to fit the resulting mixture for filtering, and filtering the mixture.

7. The method of sewage treatment comprising treating raw sewage sludge obtained from a sedimentation step to digestion passing the raw sewage overflow from said sedimentation step through activation to furnish treated sludge, by-passing a portion of the raw sludge before digestion, mixing said by-passed portion of the raw sludge with the digested and activated sludge to fit the resulting mixture for dewatering, and thereafter carrying out a dewatering step.

8. In sewage disposal a sewage treatment process carried out under conditions such that sludge of one type is derived from one stage of the process and such that sludge of another type is derived from another stage of the sewage treatment process, mixing said sludges whereby each sludge can function as a filter aid for the other sludge, and dewatering the mixture.

ANTHONY J. FISCHER.